(12) United States Patent
Hoechli et al.

(10) Patent No.: US 12,206,199 B2
(45) Date of Patent: Jan. 21, 2025

(54) PLUG CONNECTOR DEVICE, PLUG CONNECTOR AND CONNECTION CABLE

(71) Applicant: Reichle & De-Massari AG, Wetzikon (CH)

(72) Inventors: Remo Hoechli, Duernten (CH); Tensing Gyagang, Horgen (CH)

(73) Assignee: Reichle & De-Massari AG, Wetzikon (CH)

( * ) Notice: Subject to any disclaimer, the term of this patent is extended or adjusted under 35 U.S.C. 154(b) by 472 days.

(21) Appl. No.: 17/576,383

(22) Filed: Jan. 14, 2022

(65) Prior Publication Data

US 2022/0231448 A1 Jul. 21, 2022

(30) Foreign Application Priority Data

Jan. 19, 2021 (DE) ...................... 10 2021 101 044.6
Apr. 23, 2021 (DE) ...................... 10 2021 110 500.5

(51) Int. Cl.
| | |
|---|---|
| *H01R 13/46* | (2006.01) |
| *G02B 6/38* | (2006.01) |
| *H01R 13/502* | (2006.01) |
| *H01R 13/622* | (2006.01) |
| *H01R 13/64* | (2006.01) |
| *H01R 43/20* | (2006.01) |

(52) U.S. Cl.
CPC ........... *H01R 13/502* (2013.01); *G02B 6/387* (2013.01); *G02B 6/38875* (2021.05); *H01R 13/622* (2013.01); *H01R 13/64* (2013.01); *H01R 43/20* (2013.01)

(58) Field of Classification Search
CPC .... H01R 13/502; H01R 13/622; H01R 13/64; H01R 43/20; H01R 13/46; G02B 6/38875; G02B 6/387
See application file for complete search history.

(56) References Cited

U.S. PATENT DOCUMENTS

| | | | | |
|---|---|---|---|---|
| 4,753,515 A | * | 6/1988 | Sato ..................... | G02B 6/3801 |
| | | | | 385/59 |
| 5,242,315 A | * | 9/1993 | O'Dea ................... | G02B 6/387 |
| | | | | 385/59 |

(Continued)

FOREIGN PATENT DOCUMENTS

| | | |
|---|---|---|
| DE | 202016103178 U1 | 8/2016 |
| WO | 2009073500 A1 | 6/2009 |
| WO | 2018218153 A1 | 11/2018 |

OTHER PUBLICATIONS

German search report dated Dec. 13, 2021 issued in corresponding German patent application No. DE 10 2021 110 500.5 (and partial English translation).

(Continued)

*Primary Examiner* — Harshad C Patel
(74) *Attorney, Agent, or Firm* — Posz Law Group, PLC

(57) ABSTRACT

A plug connector device, in particular an optical plug connector device, with an outer housing and with an inner housing having at least one first inner housing element and at least one second inner housing element, which are in an assembled state together configured to receive at least one plug element.
The first inner housing element and the second inner housing element have at least one receiving section that is configured to receive a fixing element.

19 Claims, 9 Drawing Sheets

(56) References Cited

U.S. PATENT DOCUMENTS

Figure 1:
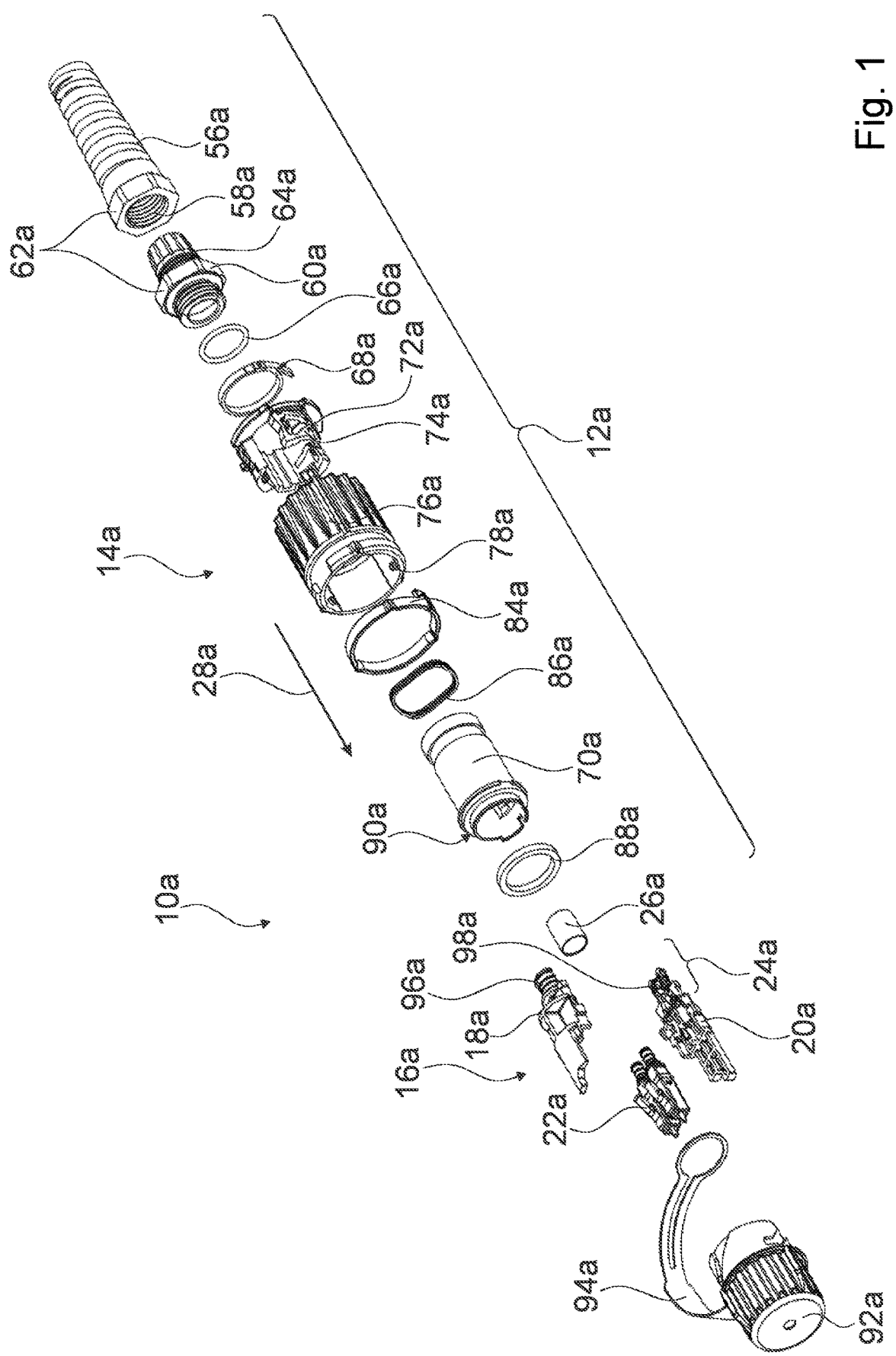

| | | | | |
|---|---|---|---|---|
| 5,383,794 | A * | 1/1995 | Davis | H01R 13/6275 |
| | | | | 439/352 |
| 6,071,145 | A * | 6/2000 | Toly | H01R 13/53 |
| | | | | 439/465 |
| 6,848,834 | B1 | 2/2005 | Roehrs et al. | |
| 8,128,440 | B2 * | 3/2012 | Matsumoto | B60L 53/16 |
| | | | | 439/731 |
| 9,270,059 | B2 * | 2/2016 | Dunwoody | H01R 13/6593 |
| 2006/0140542 | A1 * | 6/2006 | Koreeda | G02B 6/3825 |
| | | | | 385/53 |
| 2007/0190834 | A1 * | 8/2007 | Koreeda | G02B 6/3846 |
| | | | | 439/157 |
| 2008/0124030 | A1 * | 5/2008 | Scadden | G02B 6/3817 |
| | | | | 385/77 |
| 2011/0200283 | A1 * | 8/2011 | Zhovnirovsky | G02B 6/4255 |
| | | | | 385/33 |
| 2013/0266266 | A1 * | 10/2013 | Li | G02B 6/36 |
| | | | | 385/78 |
| 2017/0212312 | A1 * | 7/2017 | Tong | G02B 6/387 |
| 2017/0363818 | A1 | 12/2017 | Suzic | |
| 2018/0045894 | A1 * | 2/2018 | Takahashi | G02B 6/3877 |
| 2018/0217335 | A1 * | 8/2018 | Leeson | G02B 6/3833 |
| 2019/0033542 | A1 * | 1/2019 | Epitaux | G02B 6/4226 |
| 2019/0346633 | A1 * | 11/2019 | Cloud | G02B 6/3888 |

OTHER PUBLICATIONS

European Search Report dated May 19, 2022 issued in corresponding European patent application No. 22151731.1 (and English translation).

European Office Action dated Apr. 8, 2024 issued in corresponding European patent application No. 22151731.1 (and English translation).

* cited by examiner

PLUG CONNECTOR DEVICE, PLUG CONNECTOR AND CONNECTION CABLE

CROSS REFERENCE TO RELATED APPLICATION

This application is based on and incorporates herein by reference German Patent Application DE 10 2021 101 044.6 filed on Jan. 19, 2021 and German Patent Application DE 10 2021 110 500.5 filed on Apr. 23, 2021.

PRIOR ART

The invention concerns a plug connector device, in particular an optical plug connector device, a plug connector and a connection cable.

From U.S. Pat. No. 9,606,500 B2 a plug connector is already known which has an outer housing as well as an inner housing comprising two inner housing elements, wherein the inner housing is configured to accommodate an optical plug.

The objective of the invention is in particular to provide a generic plug connector device with improved characteristics in regard to construction. The objective is achieved according to the invention by the features of patent claims 1, 16 and 17 while advantageous implementations and further developments may be gathered from the subclaims.

Advantages of the Invention

The invention is based on a plug connector device, in particular an optical plug connector device, with an outer housing and with an inner housing comprising at least one first inner housing element and at least one second inner housing element, which are in an assembled state together configured to receive at least one plug element.

It is proposed that the first inner housing element and the second inner housing element comprise at least one receiving section that is configured to receive a fixing element.

Such an implementation in particular allows providing a plug connector device having improved characteristics regarding construction. Furthermore, in particular especially simple, quick and in particular especially reliable assembly is enabled by means of the plug connector device. It is in particular possible to provide an especially advantageous strain relief by the plug connector device. Furthermore, in particular a reliability and/or a lifetime may be improved.

The plug connector device may be implemented at least as a portion, in particular as a sub-assembly group, of a plug connector. In particular, the plug connector device may also comprise the entire plug connector. The plug connector could, for example, be realized as an electric plug connector. Preferably the plug connector is realized as an optical plug connector. It would also be conceivable that the plug connector is realized as a hybrid plug connector, which is configured to create at least one electric plug connection as well as at least one optical plug connection. The plug connector device could, for example, be realized as an electric plug connector device. Preferably the plug connector device is realized as an optical plug connector device. It would also be conceivable that the plug connector device is realized as a hybrid plug connector device.

The plug connector device comprises an outer housing, which is in particular at least substantially protected from environment influences. The outer housing is advantageously at least partly, preferably completely, sealed against environment influences. In particular, the outer housing is protected, in particular sealed, against an entry of water, for example splash water and/or rain water or the like, and/or advantageously against an entry of dust. It would be conceivable that the outer housing comprises sealing elements for a sealing against environment influences. The outer housing could, for example, comprise a protection, in particular a sealing, in accordance with an IP67 classification, advantageously with an IP68 classification. In particular, the plug connector device, and in particular a plug comprising the plug connector device, is suitable for an in particular permanent outdoor application. By "at least substantially" is to be understood, in this context, that a deviation from a given value is in particular less than 25%, preferably less than 10% and especially preferentially less than 5% of the given value.

The inner housing comprises in particular precisely one first inner housing element and in particular precisely one second inner housing element. An assembled state is in particular equivalent to a mounted, in particular functional, state, in particular in a connection with a cable.

In the assembled state at least one plug element and preferably at least two plug elements is/are arranged, in particular accommodated, at least partially between the first inner housing element and the second inner housing element. The at least one plug element, preferably the at least two plug elements, may be arranged completely within the inner housing, in particular between the first inner housing element and the second inner housing element. In the assembled state, the at least one plug element, preferably the at least two plug elements, may be mounted, in particular fixed, at least partially on the first inner housing element and/or the second inner housing element. The plug connector device may comprise the at least one plug element, preferably the at least two plug elements.

The plug element may, for example, comprise at least one optical plug and/or at least one electric plug. In particular, the plug element may be realized as an optical plug and/or as an electric plug. The plug element may, for example, comprise at least one component which holds the optical plug and/or the electric plug in the assembled state. In particular, the plug element may comprise at least one plug holder. In particular, the plug element may be realized as a plug holder, holding the optical plug and/or the electric plug in the assembled state.

The first inner housing element and the second inner housing element in particular in each case have at least one receiving section. The fixing element is in the assembled state arranged at least partially, preferably completely, within the receiving section. In particular, in the assembled state the first inner housing element forms the receiving section together with the second inner housing element. The receiving section is in the assembled state in particular a subsection of the inner housing, in particular with respect to an axial direction of the plug connector device, in particular of the plug. The axial direction of the plug connector device, in particular the plug, in particular corresponds to a main extension direction of the plug connector device, in particular the plug, said main extension direction running parallel to a longest edge of a smallest geometric rectangular cuboid which just still completely encloses the plug connector device, in particular the plug. The receiving section is in particular arranged on an end of the inner housing which is situated opposite a plugging side of the plug connector device that is arranged in a plugging direction. For example, the receiving section may be realized as a subsection of the inner housing, in particular of the first inner housing element and the second inner housing element, having for example a length of at least 2 mm, advantageously at least 4 mm, especially advantageously at least 6 mm, preferably at least 10 mm and preferably at least 12 mm.

"Configured" is to mean specifically designed and/or equipped. By an object being configured for a certain function is in particular to be understood that the object fulfills and/or executes said certain function in at least one application state and/or operation state.

Furthermore it is proposed that the first inner housing element and the second inner housing element are in each case realized as inner housing half-shells, which are in the assembled state connected to each other along an axial direction, in particular an axial direction of the plug connector device and/or of the plug connector. The first inner housing element and the second inner housing element are in particular realized as separate components. The first inner housing element and the second inner housing element may be realized, in particular at least substantially and preferably completely, identically to each other. In particular, the first inner housing element and the second inner housing element are realized as cast parts, in particular injection-molded parts. By at least one first element being "connected" to at least one further element is to be understood that the first element is advantageously connected to the further element at least via a force-fit connection and/or at least via a form-fit connection, for example by riveting and/or by a latch connection and/or by a tongue-and-groove connection and/or by a clamping connection and/or by a further connection that is deemed expedient by someone skilled in the art, and/or connected to the further element by substance-to-substance bond, for example via a welding process, a gluing process, an injection-molding process and/or via a further process deemed expedient by someone skilled in the art. Such an implementation in particular allows ensuring advantageous, in particular simple, mounting. In particular, such an implementation allows maintaining accessibility of the interior of the inner housing, in particular during assembly of the inner housing. Moreover, if the two inner housing elements are realized identically to each other, it is in particular possible to improve efficiency, in particular cost efficiency.

It is also proposed that the first inner housing element and the second inner housing element have, at least in the receiving section, geometries at least substantially complementing each other. In the assembled state the first inner housing element and the second inner housing element, in particular in the receiving section, in particular viewed in the axial direction, form a continuous shape. The first inner housing element and the second inner housing element have geometries, in particular shapes, which are realized, at least in the receiving section, at least substantially, preferably completely, identically to each other. In particular, at least in the receiving section, the first inner housing element could be realized mirror-symmetrically to the second inner housing element, in particular relative to the axial direction. Such an implementation in particular allows ensuring improved characteristics in regard to assembly. In particular, a simple, in particular form-fitting, accommodation of the fixing element in the receiving section may be ensured. It is thus further possible to improve in particular stability and/or reliability and preferably tightness.

In addition it is proposed that in the assembled state the first inner housing element forms together with the second inner housing element a hollow receiving stud in the receiving section. The hollow receiving stud in particular extends in the receiving section, in particular in the axial direction. In particular, the first inner housing element and the second inner housing element respectively comprise a half hollow receiving stud. In particular in a view of a cross section area of the hollow receiving stud, the receiving stud is implemented in a hollow manner, in particular area-related, by at least 20%, advantageously by at least 30%, especially advantageously by at least 50%, preferably by at least 70% and particularly preferentially by at least 80%. In particular, the hollow receiving stud may have an at least substantially angular outer contour in a view in the axial direction. In particular, the hollow receiving stud may have an at least substantially triangular, tetragonal or polygonal outer contour in a view in the axial direction. Preferably, the hollow receiving stud has an at least substantially round outer contour in a view in the axial direction. Such an implementation in particular allows carrying out an advantageous assembly. Furthermore, in particular stability can be improved.

It is further proposed that the inner housing has in the receiving section an adjoining surface for a strength element of a cable. In particular, the first inner housing element and/or the second inner housing element have/has an adjoining surface for the strength element of the cable. In particular, the adjoining surface is at least a portion of an outer surface of the hollow receiving stud. In the assembled state at least a portion of the strength element of the cable is in the receiving section adjacent to the adjoining surface of the inner housing. The strength element may be realized, for example, as a reinforcing fiber or as a plurality of reinforcing fibers of an optical cable. Alternatively or additionally, the strength element could be realized, for example, as a drain wire, in particular as a drain wire of an electric cable and/or of a hybrid cable. Alternatively or additionally, the strength element may be realized as a shield of the optical cable, the electric cable and/or the hybrid cable. The strength element may in particular be a strain relief element, which is in particular configured for relieving a strain on the cable, in particular on conduction elements of the cable. Such an implementation in particular allows obtaining a high degree of stability. It is in particular possible to improve the construction of the plug connector device at least in regard to reliability.

It is also proposed that the plug connector device comprises the fixing element, which in an assembled state at least partially engages around the first inner housing element and the second inner housing element, connecting them to each other, in particular fixing them with each other. In particular, the fixing element may in the assembled state connect the first inner housing element together with the second inner housing element to further connection members. In particular, in the assembled state the first inner housing element and the second inner housing element may be connected to each other, in particular fixed with each other, merely by means of the fixing element. In particular, the fixing element is plastically deformable for assembly. It would be conceivable that the fixing element is embodied, for example, as a cable tie and/or as a clamp or something like that. Preferably the fixing element is realized as a crimp element, in particular as a crimp ring or a crimp sleeve. The fixing element engages around the first inner housing element and the second inner housing element in the receiving section at least partially, and preferably completely. In particular, the fixing element engages around the hollow receiving stud at least partly, preferably completely. Such an implementation in particular allows achieving improved characteristics regarding fixing, in particular regarding stability.

Furthermore it is proposed that the fixing element is in the assembled state configured to press the strength element to the adjoining surface. In the assembled state, the fixing element fixes the strength element on the inner housing, in particular on the first inner housing element and/or on the second inner housing element, in particular in the receiving section, in particular at the adjoining surface. In particular, the fixing element presses in the assembled state the strength element to the adjoining surface, in particular for a fixing of the strength element at the adjoining surface. Such an implementation in particular allows providing a simple and/or in particular an especially effective strain relief. It is thus moreover possible to simplify an assembly of a strain relief.

Beyond this it is proposed that the fixing element comprises a cable claw, which is configured to claw a cable jacket, in particular of the cable. In particular, in the assembled state the fixing element claws the cable jacket of the cable via the cable claw. The cable claw may be implemented for example, without being limited thereto, as an edge of the fixing element pointing radially inward, in particular when viewed in the axial direction. In particular, the cable claw is a projection in the interior of the fixing element, which is in particular arranged circumferentially. Alternatively or additionally, the cable claw may comprise at least one jag and/or at least one tip pointing radially inward, in particular when viewed in the axial direction. Such an implementation allows further improving the construction, in particular in regard to stability. Such an implementation in particular allows obtaining advantageous characteristics regarding strain relief.

Beyond this it is proposed that in the assembled state the first inner housing element and/or the second inner housing element have/has at least one fixing contour in the receiving section. In particular, the first inner housing element and the second inner housing element have mutually complementary fixing sub-contours, the fixing contour being realized so as to be continuous, in particular in the assembled state. In particular, the fixing contour comprises a projection of the inner housing, in particular of the first inner housing element and/or of the second inner housing element, which—in particular viewed in the axial direction—extends around the hollow receiving stud at least section-wise, preferably completely. In particular, at least a portion of the fixing contour is part of the adjoining surface. The fixing contour is configured, in particular in the assembled state, to claw the strength element in the receiving section, in particular on the adjoining surface, and in particular via pressing by the fixing element. It would in particular be conceivable that the fixing element comprises a corresponding further fixing contour in the interior of the fixing element, in particular when viewed in the axial direction. Such an implementation allows providing an improved construction in particular in regard to stability, in particular providing an advantageous strain relief.

It is furthermore proposed that in the assembled state the fixing element has a first cross section with a first inner diameter and at least one second cross section with a second inner diameter substantially differing from the first inner diameter. In particular, the first inner diameter of the first cross section of the fixing element is in the assembled state greater than the second inner diameter of the second cross section of the fixing element, for example, at least by 5%, advantageously at least by 7%, especially advantageously at least by 10%, preferably at least by 12.5% and particularly preferentially at least by 15%. In particular, the first inner diameter of the first cross section of the fixing element is in the assembled state greater than the second inner diameter of the second cross section of the fixing element, for example, by maximally 25%, advantageously by maximally 22.5%, especially advantageously by maximally 20%, preferably by maximally 17.5% and particularly preferentially by maximally 16%. In particular, an inner contour of the fixing element is in the assembled state at least partially adapted to the fixing contour. In particular, the fixing element, in particular in a pre-crimped state, is crimped at least to an outer measurement of the fixing contour by means of a first crimp stage. Advantageously, the fixing element is in an assembled state moreover crimped to an inner measurement of the fixing contour by means of a further crimp stage wherein in particular the strength element of the cable is in the assembled state arranged between the fixing contour of the fixing element and the adjoining surface. In particular, in a cross-sectional view, the fixing element is in the assembled state formed in a wave shape. In particular, the fixing element comprises in the assembled state a plurality of ribs. Preferably the receiving section comprises a plurality of ribs, thus providing a shaping that corresponds to the fixing element. In the assembled state, the strength element of the cable is arranged between the fixing element and the receiving section in a wave shape. Such an implementation in particular allows augmenting a strength, in particular a tensile strength. It is thus in particular achievable that the strength element of the cable is in the assembled state snaked along between the contour of the fixing element and the receiving section, thus allowing to further augment the tensile strength.

In a method for producing the plug connector device, the fixing element is in a first step crimped to an outer measurement of the fixing contour by means of a first crimp stage, wherein in particular the strength element of the cable is arranged between the fixing contour and the fixing element. In particular, the fixing element is in the first step crimped to the outer measurement of the fixing contour by means of a round crimping mold. In a second step the fixing element is crimped to an inner measurement of the fixing contour by means of a second crimp stage. In particular, the fixing element is in the second step crimped to the inner measurement of the fixing contour by means of a second crimping mold, which in particular has rills.

It is further proposed that the plug connector device comprises at least one reinforcement element, which is in the assembled state arranged in the receiving section between the first inner housing element and the second inner housing element, in particular within the receiving stud. In particular, the reinforcement element is arranged in the receiving section in a hollow space of the hollow receiving stud. The reinforcement element may in particular be embodied as a pin, for example a metal pin. In particular, the reinforcement element may be realized so as to be hollow inside. Preferably the reinforcement element has an at least substantially round cross section, which in particular allows providing an especially high strength in the receiving section. The reinforcement element is in particular embodied as a sleeve, in particular as a metallic sleeve. Preferably the reinforcement element has a length in the axial direction of the plug connector device that is substantially equivalent to a corresponding length of the fixing element. Such an implementation in particular allows realizing a mounting of the fixing element via an in particular greater crimp force. Furthermore, in the assembled state the inner housing element may be reinforced by the reinforcement element. It is in particular possible to ensure an increased strength in the receiving section, and thus in particular an augmented stability and/or an increased lifetime.

In a further aspect of the invention, which may in particular be considered on its own or together with other aspects of the invention, it is proposed that the inner housing comprises at least one guiding unit, which is configured to guide at least one conduction element in particular to the plug element. In particular, at least a portion of the guiding unit may be part of the first inner housing element and/or of the second inner housing element. By such an implementation in particular an augmented reliability is enabled. It is thus in particular possible to avoid damaging of the conduction element.

It is also proposed that the guiding unit is configured to delimit a bending radius of the conduction element in the inner housing to a minimum radius. In particular, the guiding unit is configured to delimit the bending radius of the conduction element in the inner housing in such a way that the bending radius of the conduction element in the inner housing is in the assembled state, for example, at least a 5-fold of a conduction cross section of the conduction element, advantageously at least a 7.5-fold of a conduction cross section of the conduction element, especially advantageously at least a 10-fold of a conduction cross section of the conduction element, preferably at least a 15-fold of a conduction cross section of the conduction element, particularly preferentially at least a 20-fold of a conduction cross section of the conduction element. Such an implementation in particular allows ensuring a high level of reliability. In particular, in this way damaging of the conduction element is avoidable. Furthermore, it is thus possible to ensure advantageous data transmission via the conduction element.

It is moreover proposed that the first inner housing element and the second inner housing element each comprise a guiding subchannel for guiding the conduction element, in particular to the plug element. In particular, in the assembled state the first inner housing element and the second inner housing element form a guiding channel for guiding the conduction element, in particular to the plug element. Such an implementation in particular allows holding the conduction element in a mounting position, which in particular simplifies mounting and/or assembly. By such an implementation it is in particular possible to prevent damaging of the conduction element, in particular during assembly and/or at low temperatures.

It is further proposed that the first inner housing element and/or the second inner housing element comprise/s in the guiding subchannel at least one holding element for holding the conduction element in the guiding subchannel. In particular, the holding element is realized as a low-holding element. In particular, the holding element that is realized as a low-holding element is in the assembled state free of a clamping of the conduction element. It would be conceivable, for example, that the holding element is embodied as a cable clip. It would furthermore be conceivable that the holding element is embodied as a flexible plastic lip, which is configured, in an assembled state, to clamp the at least one conduction element. It would also be conceivable that the holding element at least prevents an axial displacement of the conduction element by holding the conduction element. Such an implementation in particular allows ensuring a high level of reliability. It is thus in particular possible to avoid damaging of the conduction element. Moreover, this advantageously ensures advantageous data transmission via the conduction element.

Furthermore it is proposed that the first inner housing element and the second inner housing element each comprise a second guiding subchannel for guiding a further conduction element, in particular to the plug element. In particular, in the assembled state the first inner housing element and the second inner housing element form a second guiding channel for guiding the conduction element, in particular to the plug element. In particular, such an implementation allows holding the conduction element in a mounting position, thus in particular simplifying mounting and/or assembly. By such an implementation it is in particular possible to prevent damaging of the conduction element, in particular during assembly and/or at low temperatures.

The invention also concerns a plug connector, in particular an optical plug connector, with the plug connector device. Such a plug connector allows providing improved characteristics in regard to construction.

Beyond this the invention concerns a connection cable, in particular an optical connection cable, with the at least one plug connector and with a cable that is assembled with the plug connector. Such a connection cable in particular provides improved characteristics in regard to reliability and/or in regard to assembly.

The plug connector device according to the invention shall herein not be limited to the application and implementation described above. In particular, for the purpose of fulfilling a functionality that is described here, the plug connector device according to the invention may comprise a number of individual elements, components and units that differs from a number given here.

DRAWINGS

Further advantages may be gathered from the following description of the drawings. In the drawings five exemplary embodiments of the invention are illustrated. The drawings, the description and the claims contain a plurality of features in combination. Someone skilled in the art will purposefully also consider the features separately and will find further expedient combinations.

Figure 2:
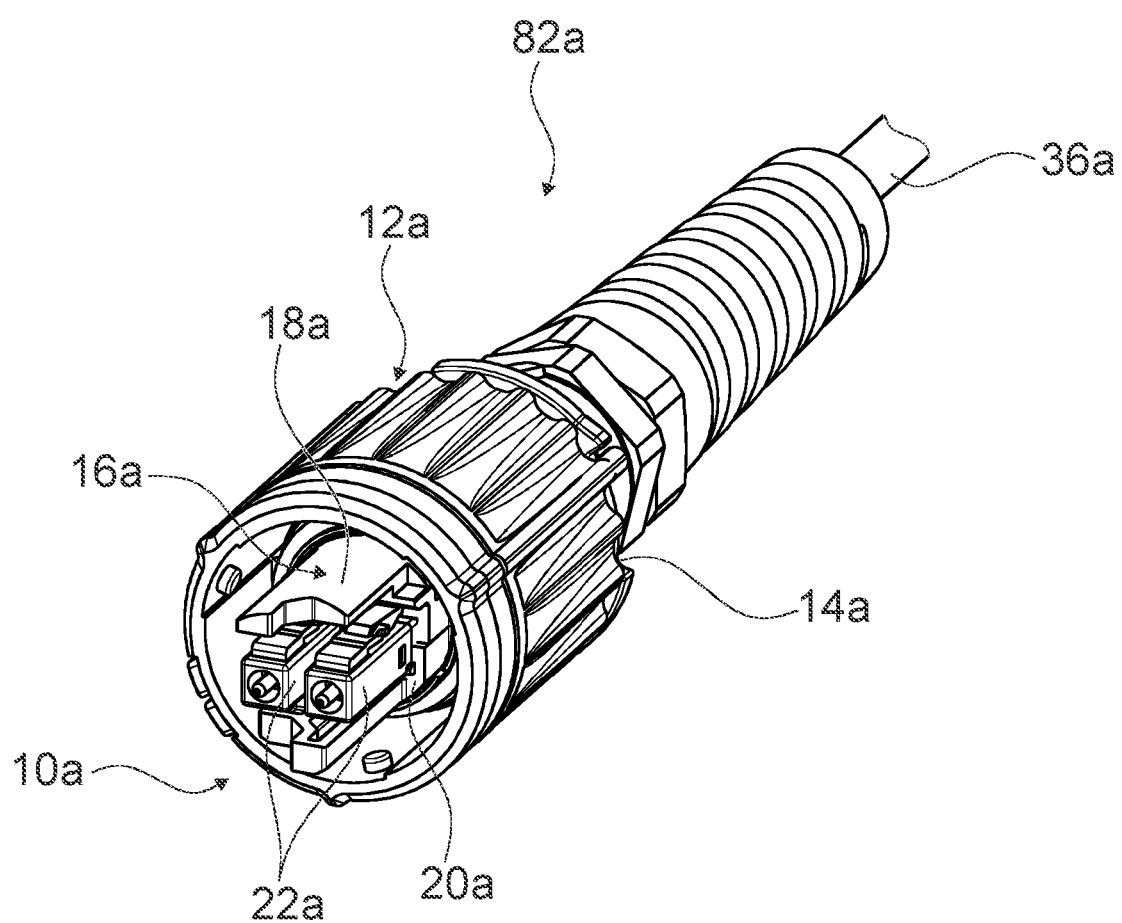
Figure 3:
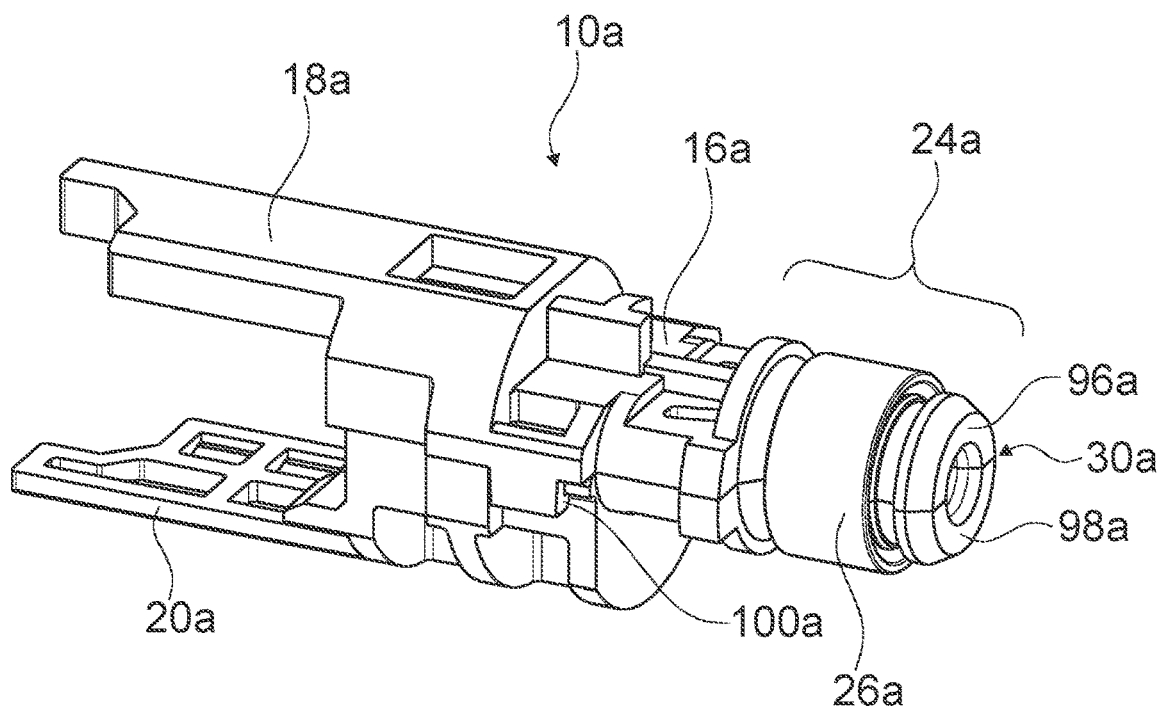
Figure 4:
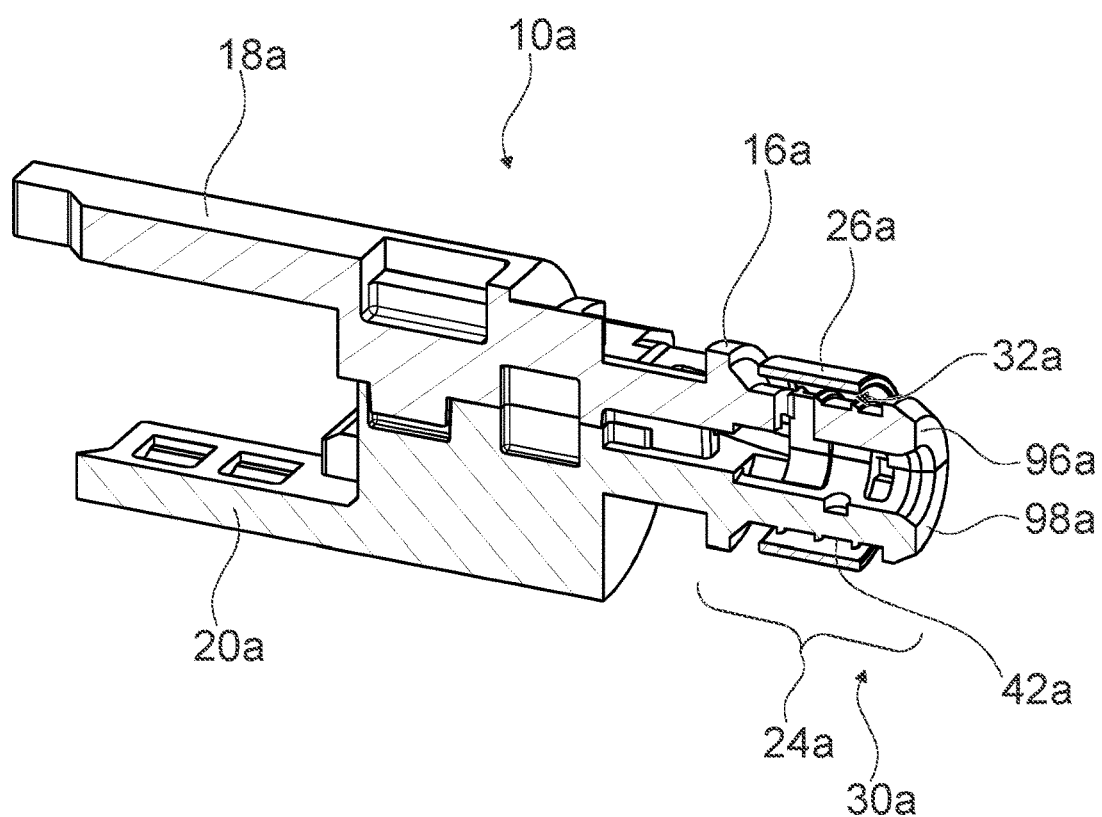
Figure 5:
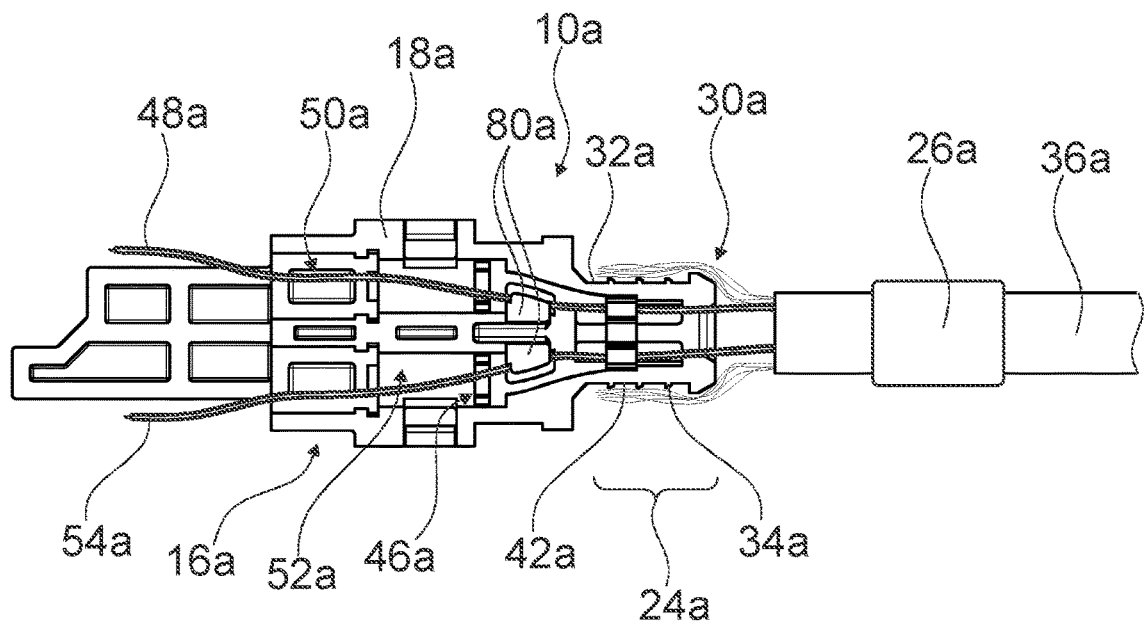
Figure 6:
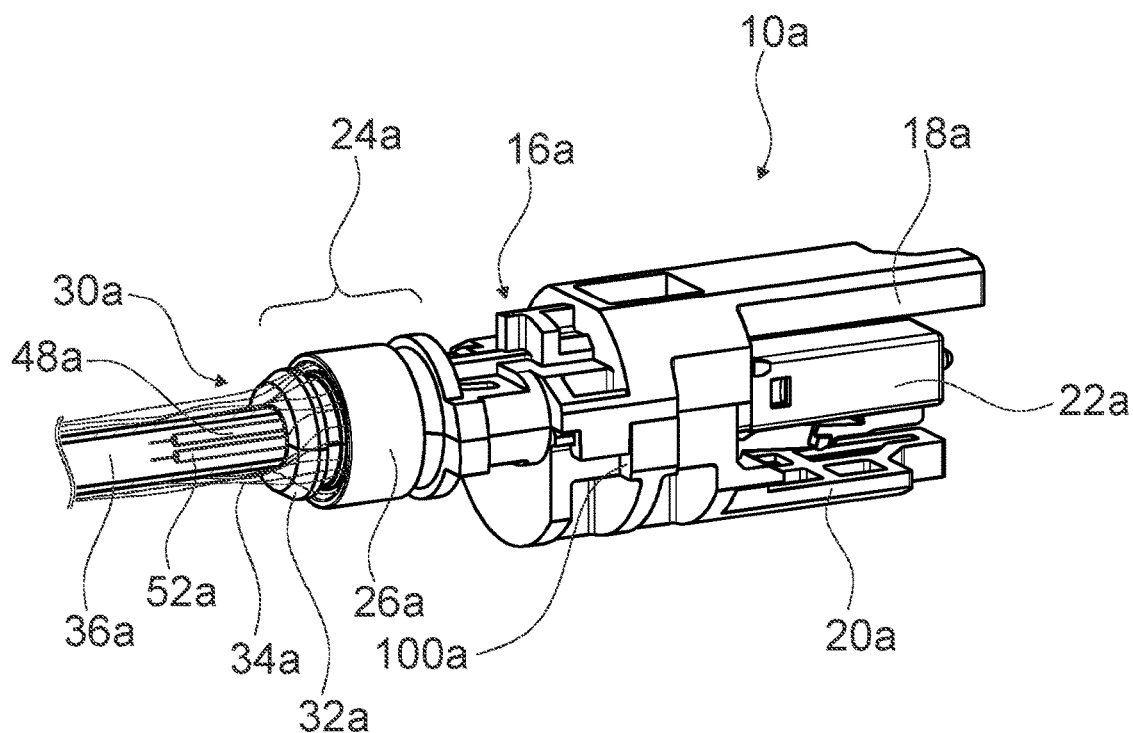
Figure 7:
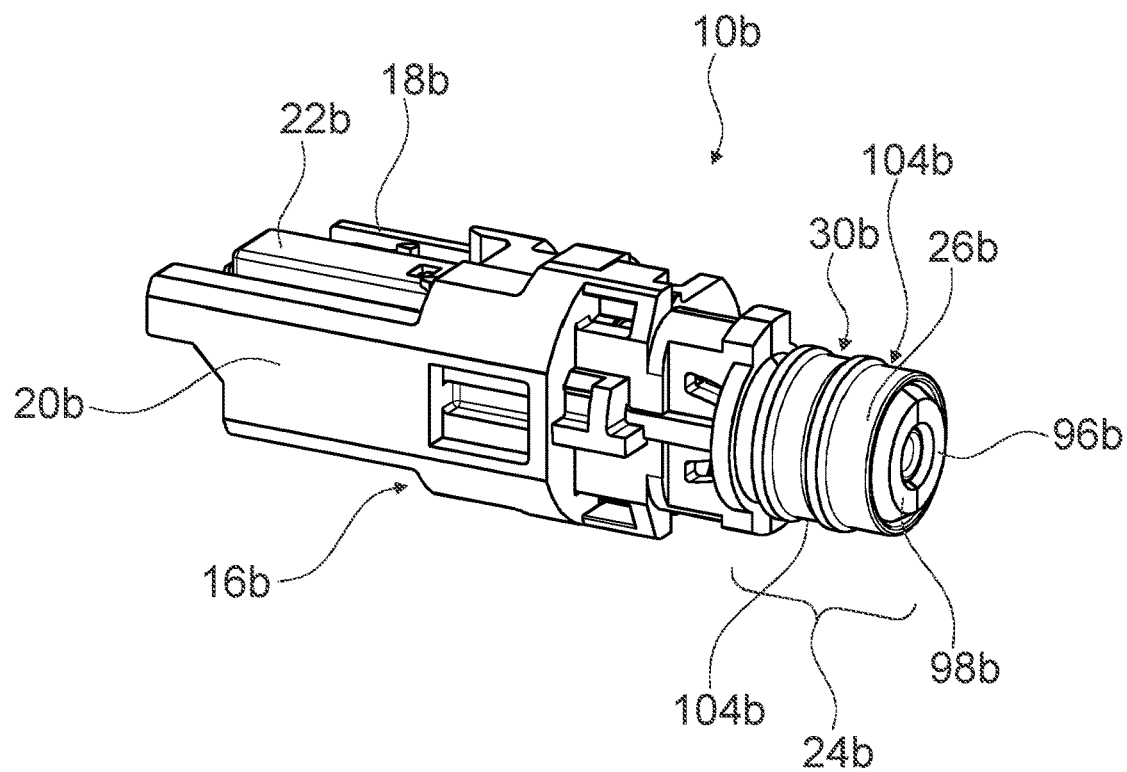
Figure 8:
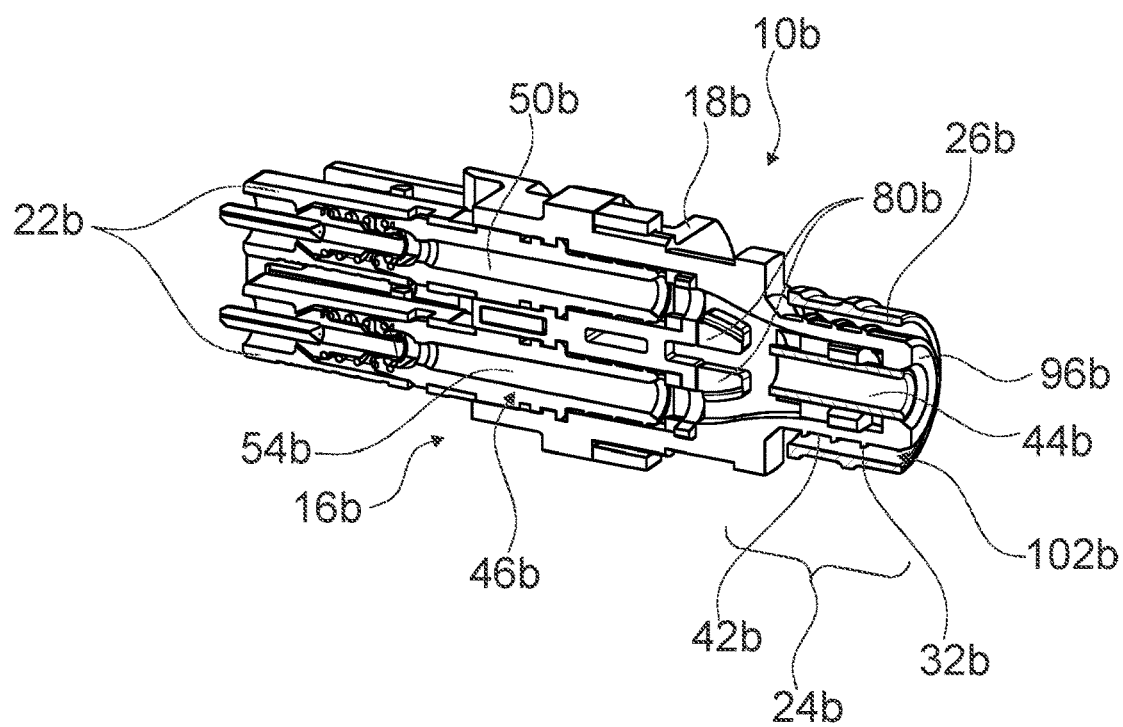
Figure 9:
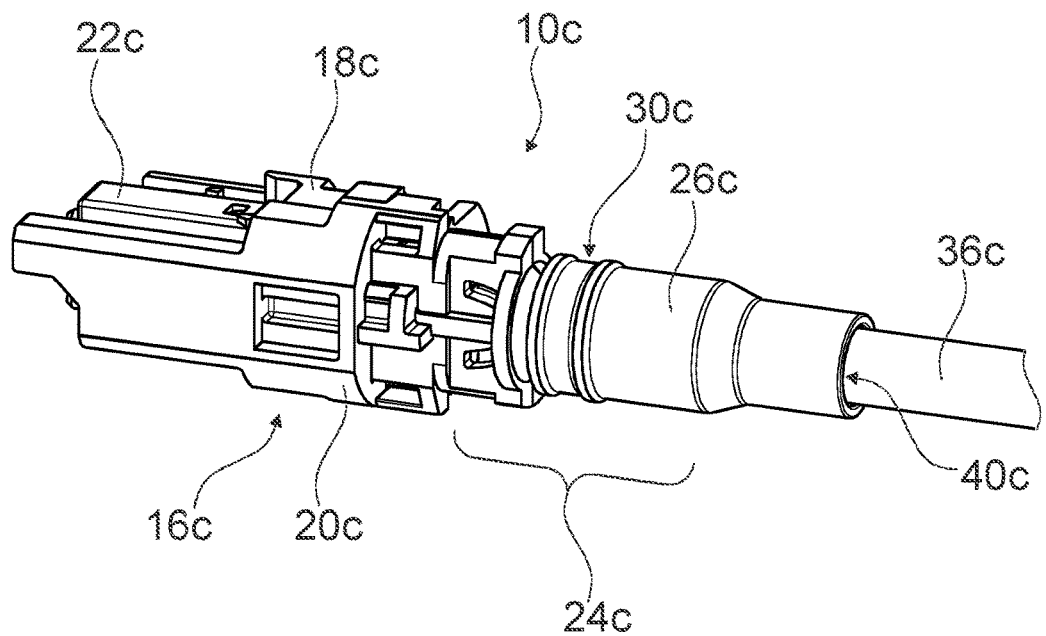
Figure 10:
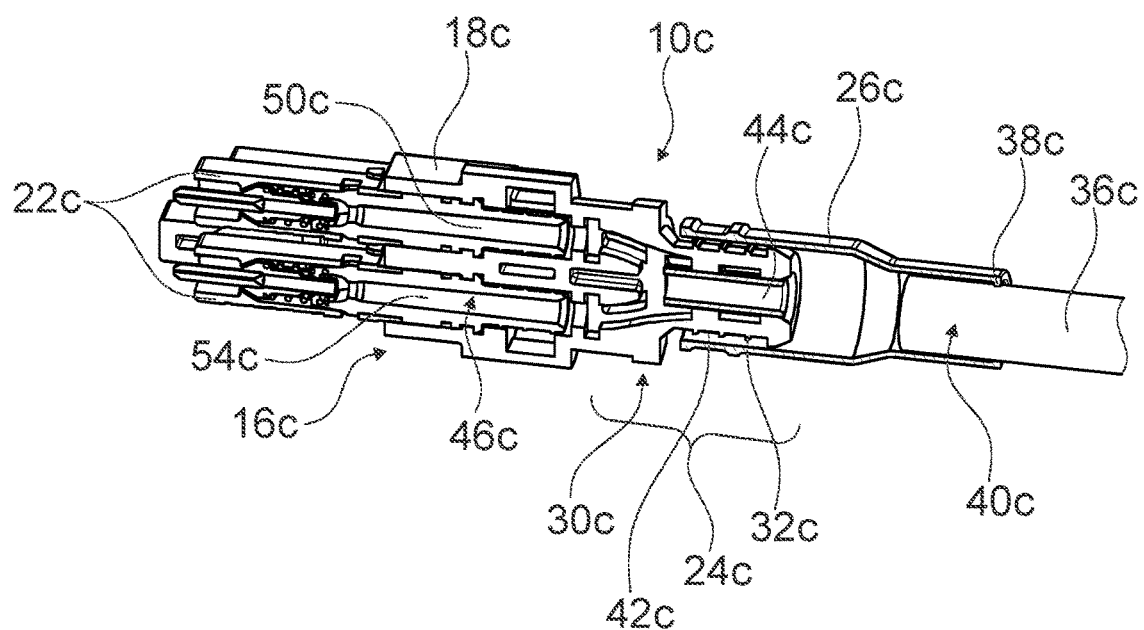
Figure 11:
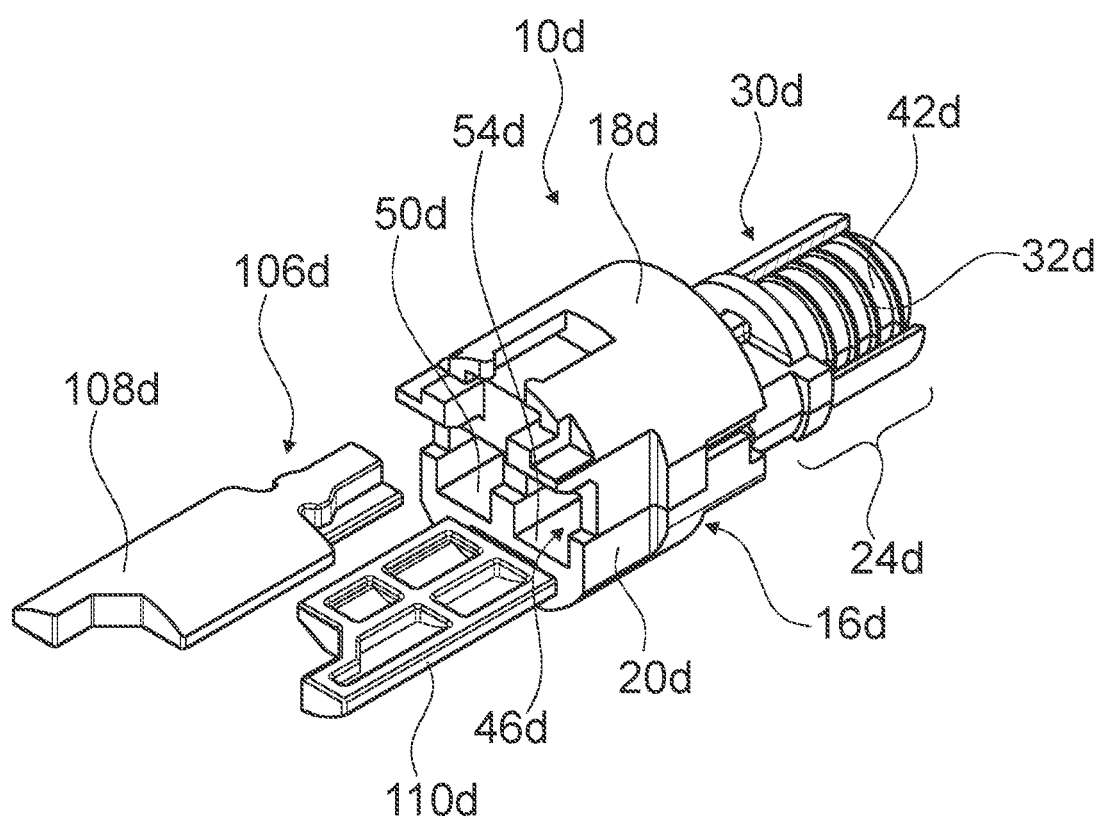
Figure 12:
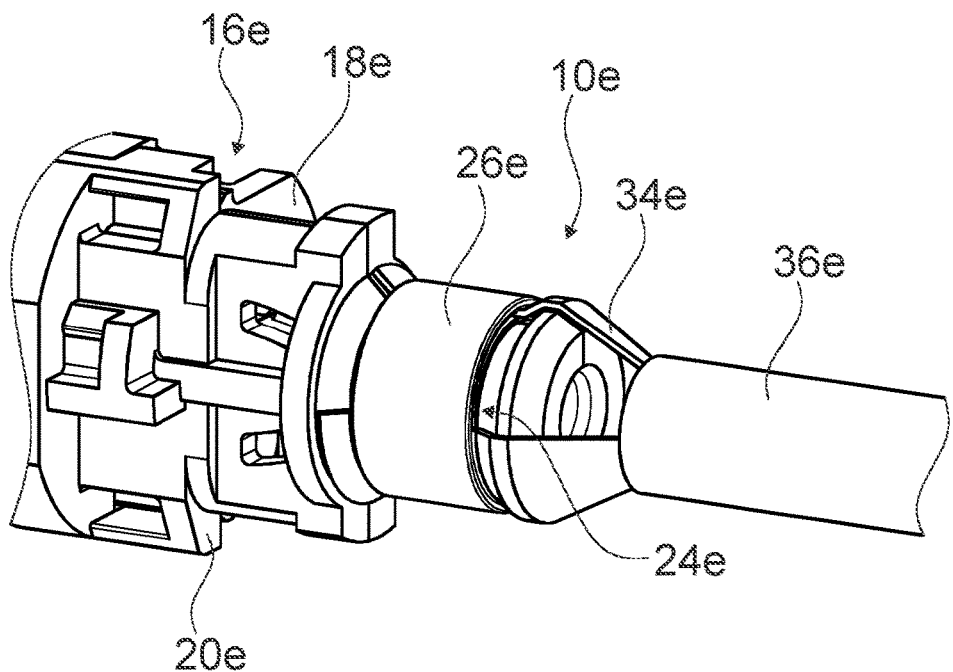
Figure 13:
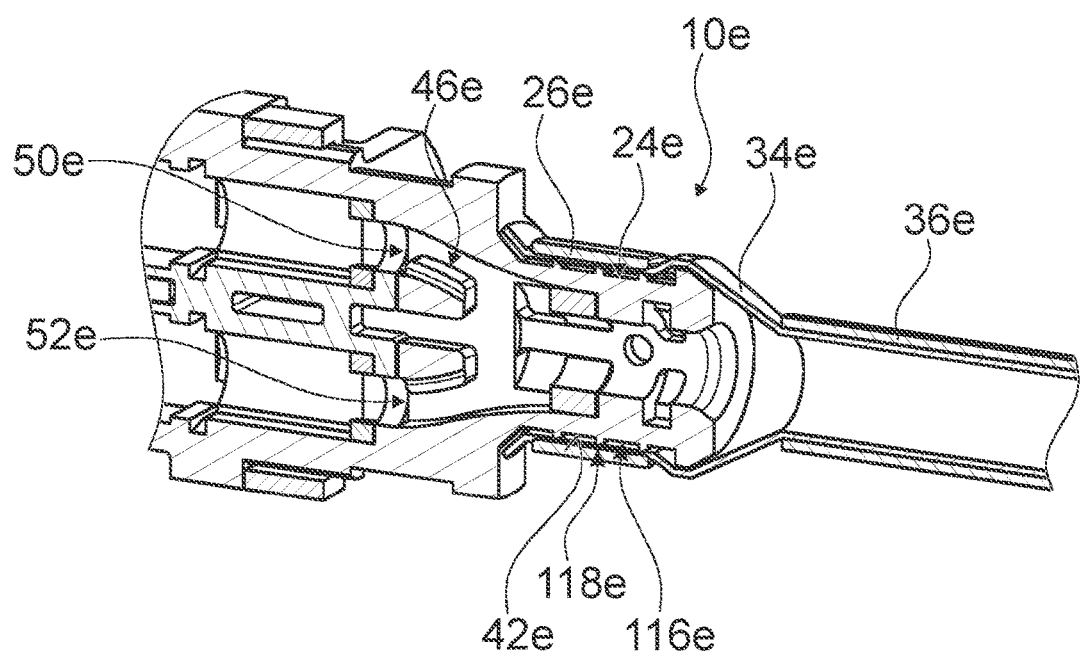
Figure 14:
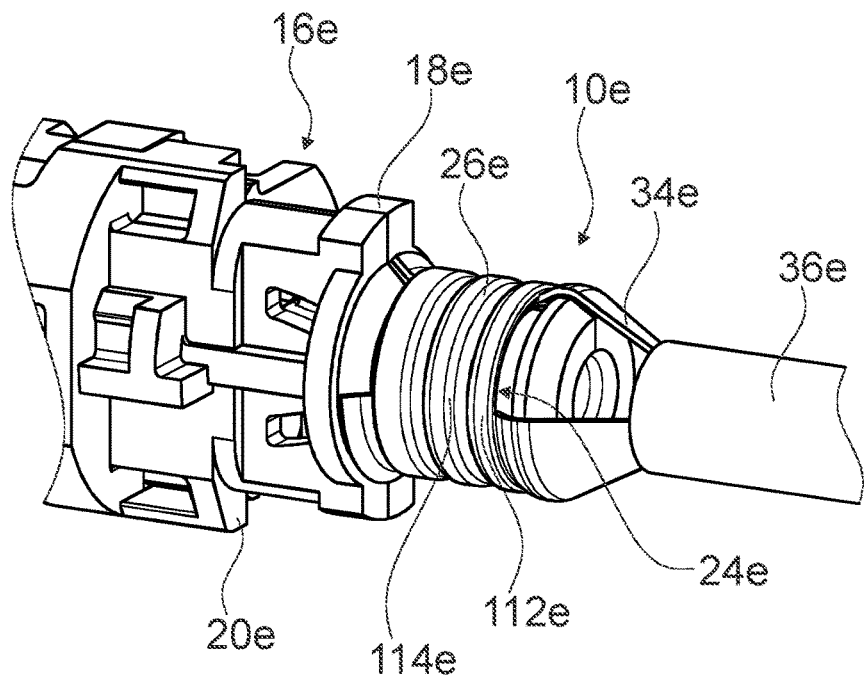
Figure 15:
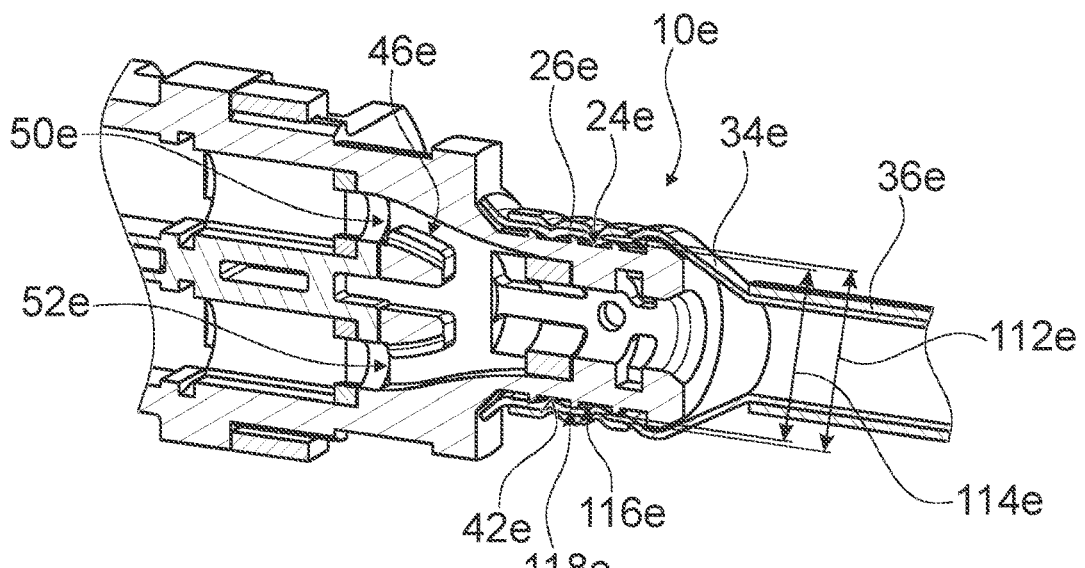
Figure 16:
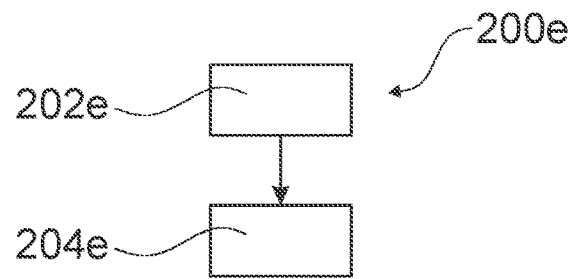

It is shown in:

FIG. 1 a plug connector with a plug connector device, in an exploded view,

FIG. 2 the plug connector in an assembled state, in a schematic perspective view, FIG. 3 the plug connector device with an inner housing and with a fixing element, in a schematic perspective view, FIG. 4 a perspective sectional view of the inner housing with a first inner housing element and with a second inner housing element, FIG. 5 a portion of the inner housing with the first inner housing element and with an adjoining surface for a strength element of a cable, FIG. 6 the inner housing with the fixing element accommodated in a receiving section of the inner housing, FIG. 7 a plug connector device of a further exemplary embodiment, in a schematic perspective view, FIG. 8 a portion of the plug connector device with a portion of an inner housing of the plug connector device comprising a first inner housing element, in a schematic perspective view, FIG. 9 a plug connector device of a further exemplary embodiment, in a schematic perspective view, FIG. 10 a portion of the plug connector device with a portion of an inner housing of the plug connector device comprising a first inner housing element, in a schematic perspective view, FIG. 11 a plug connector device of a further exemplary embodiment with a centering unit, in a schematic perspective view, FIG. 12 a portion of a plug connector device of a further exemplary embodiment in a pre-assembled state, in a perspective view, FIG. 13 the plug connector device with a portion of an inner housing of the plug connector device with a first inner housing element in a preassembled state, in a schematic sectional perspective view, FIG. 14 the plug connector device with a fixing element in an assembled state, in a perspective view, FIG. 15 the plug connector device with a fixing element in an assembled state, in a schematic sectional perspective view, and FIG. 16 a flow chart of a method for producing a plug connector device.

DESCRIPTION OF THE EXEMPLARY EMBODIMENTS

FIG. 1 shows a plug connector 12a in an exploded view. FIG. 2 shows a connection cable 82a, which is embodied as an optical connection cable. The connection cable 82a comprises the plug connector 12a as well as a cable 36a that is assembled with the plug connector 12a. The plug connector 12a is realized as an optical plug connector. The plug connector 12a comprises a plug connector device 10a (cf. FIGS. 1 and 2). The plug connector 12a is sealed against environment influences and is suitable for an outdoor use.

The plug connector device 10a comprises an outer housing 14a. The outer housing 14a comprises a bushing 56a. The bushing 56a is implemented of a flexible synthetic material. The bushing 56a is configured to prevent a kinking of a cable and to provide the cable with a strain relief. The bushing 56a comprises an inner thread 58a, by means of which the bushing 56a can be screwed onto a cable screwing 60a of the outer housing 14a.

The cable screwing 60a and the bushing 56a respectively comprise a hexagonal tool holder 62a, which is in particular configured for receiving a spanner wrench. The cable screwing 60a comprises an outer thread 64a that corresponds to the inner thread 58a. The outer housing 14a moreover comprises a sealing element 66a.

The outer housing 14a furthermore comprises a cable tie 68a, which is in the assembled state fastened around a sleeve 70a, in particular in order to prevent undesired sliding of a sliding collar 72a of the outer housing 14a. The sliding collar 72a comprises a plurality of recesses, which together form a triangular groove 74a.

In the assembled state the groove 74a accommodates a plurality of pins 78a of an actuation element 76a of the outer housing 14a. The actuation element 76a is rotatable. The sliding collar 72a is displaceable by a rotation of the actuation element 76a, via a corresponding force transmission by the pins 78a to the groove 74a. By rotation of the actuation element 76a, causing a displacement of the sliding collar 72a, a locking mechanism of the plug connector 12a is operated.

The outer housing 14a further comprises a coding member 84a. The coding member 84a is embodied as a color-coding ring. In the assembled state the coding member 84a, which is embodied as a color-coding ring, sits in a corresponding recess of the actuation element 76a. In the assembled state the coding member 84a is visible from an outside.

The outer housing 14a also comprises a spring element 86a. The spring element 86a is realized as a sinuous spring. In the assembled state the spring element 86a has been slid onto the sleeve 70a. In the assembled state the spring element 86a provides a spring force acting onto the actuation element 76a. In the assembled state the spring force prevents an inadvertent releasing of the plug connector 12a.

The sleeve 70a is realized so as to be hollow and has a substantially cylindrical shape. The sleeve 70a is in particular free of orientation means. The sleeve 70a comprises an inner thread (not shown), via which the sleeve 70a can be screwed with a corresponding outer thread of the cable screwing 60a. The outer housing 14a further comprises an O-ring 88a. In the assembled state the O-ring 88a sits in a recess 90a of the sleeve 70a. The O-ring 88a serves for a further sealing of the outer housing 14a against environment influences.

The outer housing 14a moreover comprises a closure 92a. The closure 92a is realized as a dust-protection cap. The closure 92a comprises a fastening member 94a. The closure 92a is in the assembled state fastened by means of the fastening member 94a. The fastening member 94a is embodied as a flexible loop.

The plug connector device 10a further comprises an inner housing 16a. The inner housing 16a comprises a first inner housing element 18a. The inner housing 16a furthermore comprises a second inner housing element 20a.

The plug connector device 10a comprises two plug elements 22a. The first inner housing element 18a and the second inner housing element 20a are in the assembled state configured to accommodate the two plug elements 22a (cf. FIGS. 1 and 2).

The first inner housing element 18a and the second inner housing element 20a comprise a receiving section 24a. Viewed in an axial direction 28a, the receiving section 24a is arranged on a side of the inner housing 16a that is situated opposite a plugging side of the plug connector 12a. The receiving section 24a is configured to receive a fixing element 26a.

The first inner housing element 18a and the second inner housing element 20a are respectively embodied as inner housing half-shells. In the assembled state the first inner housing element 18a and the second inner housing element 20a are connected to each other along the axial direction 28a.

The first inner housing element 18a and the second inner housing element 20a have at least in the receiving section 24a a mutually complementary geometry (cf. FIGS. 3 and 4). In the assembled state the first inner housing element 18a and the second inner housing element 20a form a continuous receiving section 24a. In the illustrated example, the first inner housing element 18a and the second inner housing element 20a have in the receiving section 24a a substantially half-hollow-cylindrical shaping.

The first inner housing element 18a comprises a first sub-stud 96a in the receiving section 24a. The second inner housing element 20a comprises a second sub-stud 98a in the receiving section 24a. In the assembled state, the first inner housing element 18a forms together with the second inner housing element 20a a hollow receiving stud 30a in the receiving section 24a.

Beyond this the plug connector device 10a comprises the fixing element 26a. In the assembled state the fixing element 26a connects the first inner housing element 18a and the second inner housing element 20a at least partially. In the present example, the first inner housing element 18a and the second inner housing element 20a further comprise latching members 100a for a connection to each other.

In the illustrated exemplary embodiment the fixing element 26a is embodied as a crimp ring. In the assembled state, the fixing element 26a engages completely around the first inner housing element 18a and the second inner housing element 20a in the receiving section 24a. In the assembled state, the fixing element engages around the receiving stud 30a in the receiving section 24a.

The inner housing 16a comprises in the receiving section 24a an adjoining surface 32a for a strength element 34a of the cable 36a (cf. FIGS. 5 and 6). The strength element 34a of the cable 36a is realized as reinforcing fibers of the cable 36a. The adjoining surface 32a for the strength element 34a of the cable 36a is an outer surface of the hollow receiving stud 30a in the receiving section 24a.

The fixing element 26a is in the assembled state configured to press the strength element 34a to the adjoining surface 32a. The fixing element 26a is in the assembled state configured to press the strength element 34a against the hollow receiving stud 30a in the receiving section 24a.

The first inner housing element 18a has in the receiving section a fixing contour 42a. Furthermore, the second inner housing element 20a has in the receiving section 24a a fixing contour 42a. The fixing contour 42a comprises a plurality of radial elevations. The fixing contour 42a serves for an additional fixing of the strength element 34a on the receiving stud 30a.

The inner housing 16a comprises a guiding unit 46a. The guiding unit 46a is configured to guide at least one conduction element 48a of the cable 36a. The guiding unit 46a is in the assembled state configured for guiding the at least one conduction element 48a to the plug element 22a. The at least one conduction element 48a is in the present example an optical fiber, in particular an optical waveguide, of the cable 36a.

The guiding unit 46a is moreover configured to delimit a bending radius of the conduction element 48a in the inner housing 16a to a minimum radius. In the example shown the guiding unit 46a is configured to delimit the bending radius of the conduction element 48a in the inner housing 16a to at least a fifteen-fold of a conduction diameter of the conduction element 48a.

For a guidance of the conduction element 48a, in particular to the plug element 22a, the first inner housing element 18a comprises a guiding subchannel 50a. For a guidance of a further conduction element 54a of the cable 36a, in particular to the plug element 22a, the first inner housing element 18a comprises a second guiding subchannel 52a. The second inner housing element 20a comprises guiding subchannels which are identical to the guiding subchannels.

The guiding subchannel 50a and the second guiding subchannel 52a are part of the guiding unit 46a. The guiding subchannel 50a and the second guiding subchannel 52a are configured, in particular in a pre-assembled state, to hold the conduction element 48a and the further conduction element 54a in a mounting position. The guiding subchannel 50a and the second guiding subchannel 52a are moreover configured to prevent an undulation of the conduction element 48a and the further conduction element 54a, in particular at low temperatures.

The first inner housing element 18a comprises in the guiding subchannel 50a a holding element 80a for holding the conduction element 48a. The second inner housing element 20a comprises in the second guiding subchannel 50a a holding element 80a for holding the further conduction element 54a.

The holding elements 80a are in particular configured for fixing the conduction element 48a and the further conduction element 54a, in particular in the axial direction. The holding elements 80a prevent the conduction element 48a and the further conduction element 54a from being pushed out of a cable jacket of the cable 36a. The holding elements 80a are realized as flexible tabs, which are configured to clamp the conduction element 48a and the further conduction element 54a in the assembled state.

In FIGS. 7 to 16 four further exemplary embodiments of the invention are shown. The following descriptions and the drawings are essentially limited to the differences between the exemplary embodiments, wherein principally, regarding identically denominated components, in particular regarding components having the same reference numeral, the drawings and/or the description of the other exemplary embodiments, in particular of FIGS. 1 to 6, may be referred to. In order to distinguish between the exemplary embodiments, the letter a has been added to the reference numerals of the exemplary embodiment of FIGS. 1 to 6. In the exemplary embodiments of FIGS. 7 to 16 the letter a has been replaced by the letters b to e.

FIGS. 7 and 8 show a plug connector device 10b of a further exemplary embodiment of the invention. The plug connector device 10b comprises an inner housing 16b. The inner housing 16b comprises a first inner housing element 18b. The inner housing 16b furthermore comprises a second inner housing element 20b.

The plug connector device 10b comprises two plug elements 22b. In the assembled state, the first inner housing element 18b and the second inner housing element 20b are configured to receive the two plug elements 22b.

The first inner housing element 18b and the second inner housing element 20b comprise a receiving section 24b. In the assembled state, the first inner housing element 18b forms together with the second inner housing element 20b a hollow receiving stud 30b in the receiving section 24b. The receiving section 24b is configured to receive a fixing element 26b.

The inner housing 16b comprises a reinforcement element 44b. The reinforcement element 44b is embodied as a metal sleeve. In the assembled state, the reinforcement element 44b is arranged in the receiving section 24b between the first inner housing element 18b and the second inner housing element 20b, in particular within the receiving stud 30b.

The first inner housing element 18b has a fixing contour 42b in the receiving section. Furthermore, the second inner housing element 20b has a fixing contour 42b in the receiving section 24b. The fixing contour 42b comprises a plurality of radial elevations.

The fixing element 26b has a further fixing contour 104b on its outer side. The further fixing contour 104b serves for receiving a tool, in particular a crimping tool, in a force-fit and/or form-fit manner. The receiving stud 30b has a narrowly tapering end, in particular a bevel 102b.

FIGS. 9 and 10 show a plug connector device 10c of a further exemplary embodiment of the invention. The plug connector device 10c comprises an inner housing 16c. The inner housing 16c comprises a first inner housing element 18c. The inner housing 16c further comprises a second inner housing element 20c.

The first inner housing element 18c and the second inner housing element 20c comprise a receiving section 24c. In the assembled state, the first inner housing element 18c forms together with the second inner housing element 20c a hollow receiving stud 30c in the receiving section 24c. The receiving section 24c, in particular the hollow receiving stud 30c, is configured to receive a fixing element 26c.

The inner housing 16c comprises a reinforcement element 44c. The reinforcement element 44c is embodied as a metal sleeve. In the assembled state, the reinforcement element 44c is arranged in the receiving section 24c between the first inner housing element 18c and the second inner housing element 20c, in particular within the receiving stud 30c.

The fixing element 26c comprises a cable claw 38c. In the assembled state, the cable claw 38c claws a cable jacket 40c of a cable 36c. The cable claw 38c is realized as a radial projection in the interior of the fixing element 26c. In the example shown the fixing element 26c has two regions, which have different diameters. The cable claw 38c is arranged in an end of the plug connector 12c that is situated opposite a plugging side of the plug connector 12c.

FIG. 11 shows a plug connector device 10d of a further exemplary embodiment of the invention. The plug connector device 10d comprises an inner housing 16d. The inner housing 16d comprises a first inner housing element 18d. The inner housing 16d further comprises a second inner housing element 20d.

The inner housing 16d comprises a centering unit 106d. The centering unit 106d serves for a centering during assembly of the plug connector device 10d, in particular for a centering of plug elements of the plug connector device 10d. In particular, the centering unit 106d prevents an erroneously oriented plug connection.

A first centering element 108d of the centering unit 106d is arranged on the first inner housing element 18d. A second centering element 110d of the centering unit 106d is arranged on the second inner housing element 20d.

The first centering element 108d and the second centering element 110d are in each case realized so as to be removable. In the example shown, the first centering element 108d and the second centering element 110d respectively latch at the first inner housing element 18d and at the second inner housing element 20d in an assembled state. Alternatively, the first centering element 108d and the second centering element 110d could be connected integrally to the first inner housing element 18d and the second inner housing element 20d.

The implementation of the centering unit 106d is not limited to the present exemplary embodiment. In particular, the modular centering unit may be part of the plug connector devices 10a-c of the preceding exemplary embodiments.

FIGS. 12 to 15 show a plug connector device 10e of a further exemplary embodiment of the invention. The plug connector device 10e differs from the plug connector devices of the preceding exemplary embodiments of the invention in regard to a fixing element 26e of the plug connector device 10e. In particular, the implementation of the fixing element 26e described below is also applicable to the plug connector devices of the preceding exemplary embodiments.

FIGS. 12 and 13 show a portion of the plug connector device 10e with the fixing element 26e in a pre-assembled state, i. e. in a pre-crimped state. FIGS. 14 and 15 show the portion of the plug connector device 10e with the fixing element 26e in an assembled state, i. e. in a fully crimped state. In the pre-assembled state and in the assembled state (cf. FIGS. 12 to 15), the fixing element 26e has a first cross section 112e with a first inner diameter. Furthermore, in the assembled state, the fixing element 26e has at least one second cross section 114e with a second inner diameter that substantially differs from the first diameter (cf. FIGS. 14 and 15). In the example shown, the first inner diameter of the first cross section 112e is greater than the second diameter of the second cross section 114e by 16%. Between the fixing element 26e and a receiving section 24e of a first inner housing element 18e and/or of a second inner housing element 20e of the plug connector device 10e, a strength element 34e of a cable 36e is arranged.

FIG. 16 illustrates a method 200e for producing a plug connector device 10e. In a first step 202e of the method 200e, a fixing element 26e of the plug connector device 10e is crimped by means of a first crimp stage to an outer measurement 116e of a fixing contour 42e of a receiving section 24e of a first inner housing element 18e and/or of a second inner housing element 20e of the plug connector device 10e (cf. also FIGS. 12 and 13). In the first step 202e furthermore a strength element 34e of a cable 36e is arranged between the fixing contour 42e and the receiving section 24e.

In a second step 204e of the method 200e, the fixing element 26e is crimped by means of a second crimp stage to an inner measurement 118e of the fixing contour 42e (cf. also FIGS. 14 and 15).

REFERENCE NUMERALS 10 plug connector device
12 plug connector
14 outer housing
16 inner housing
18 first inner housing element
20 second inner housing element
22 plug element
24 receiving section
26 fixing element
28 axial direction
30 receiving stud
32 adjoining surface
34 strength element
36 cable
38 cable claw
40 cable jacket
42 fixing contour
44 reinforcement element
46 guiding unit
48 conduction element
50 guiding sub-channel
52 second guiding sub-channel
54 further conduction element
56 bushing
58 inner thread
60 cable screwing
62 tool holder
64 outer thread
66 sealing element
68 cable tie
70 sleeve
72 sliding collar
74 groove
76 actuation element
78 pin
80 holding element
82 connection cable
84 coding member
86 spring element
88 O-ring
90 recess 92 closure
94 fixing member
96 first sub-stud
98 second sub-stud
100 latching member
102 bevel
104 further fixing contour
106 centering unit
108 centering element
110 further centering element
112 first cross section
114 second cross section
116 outer measurement
118 inner measurement
200 method
202 first step
204 second step

The invention claimed is:

1. A plug connector device with an outer housing and with an inner housing comprising at least one first inner housing element and at least one second inner housing element, which are in an assembled state together configured to receive at least one plug element, wherein the first inner housing element and the second inner housing element comprise at least one receiving section that is configured to receive a separate fixing element, which in an assembled state at least partially engages around the first inner housing element and the second inner housing element, connecting them to each other.

2. The plug connector device according to claim 1, wherein the first inner housing element and the second inner housing element are in each case realized as inner housing half-shells, which are in the assembled state connected to each other along an axial direction.

3. The plug connector device according to claim 1, wherein the first inner housing element and the second inner housing element have, at least in the receiving section geometries at least substantially complementing each other.

4. The plug connector device according to claim 1, wherein in the assembled state the first inner housing element forms together with the second inner housing element a hollow receiving stud in the receiving section.

5. The plug connector device according to claim 1, wherein the inner housing has in the receiving section an adjoining surface for a strength element of a cable.

6. The plug connector device according to claim 5, wherein the fixing element is in the assembled state configured to press the strength element to the adjoining surface.

7. The plug connector device according to claim 1, wherein the fixing element comprises a cable claw, which is configured to claw a cable jacket.

8. The plug connector device according to claim 1, wherein in the assembled state the first inner housing element and/or the second inner housing element have/has at least one fixing contour in the receiving section.

9. The plug connector device according to claim 1, wherein in the assembled state the fixing element has a first cross section with a first inner diameter and at least one second cross section with a second inner diameter substantially differing from the first diameter.

10. The plug connector device according to claim 1, further comprising at least one reinforcement element, which is in the assembled state arranged in the receiving section between the first inner housing element and the second inner housing element.

11. A plug connector device according to claim 1, wherein the inner housing comprises at least one guiding unit, which is configured to guide at least one conduction element.

12. The plug connector device according to claim 11, wherein the guiding unit is configured to delimit a bending radius of the conduction element in the inner housing to a minimum radius.

13. The plug connector device according to claim 12, wherein the first inner housing element and the second inner housing element each comprise a guiding subchannel for guiding the conduction element.

14. The plug connector device according to claim 12, wherein the first inner housing element and the second inner housing element each comprise a guiding subchannel for guiding the conduction element, wherein the first inner housing element and/or the second inner housing element comprise/s in the guiding subchannel at least one holding element for holding the conduction element in the guiding subchannel.

15. The plug connector device according to claim 12, wherein the first inner housing element and the second inner housing element each comprise a guiding subchannel for guiding the conduction element, wherein the first inner housing element and the second inner housing element each comprise a second guiding subchannel for guiding a further conduction element.

16. A plug connector, with at least one plug connector device according to claim 1.

17. A connection cable, with at least one plug connector according to claim 16, wherein the connection cable is assembled with the plug connector.

18. A method for producing a plug connector device according to claim 9, wherein the fixing element is in a first step crimped to an outer measurement of the fixing contour by means of a first crimp stage, wherein the fixing element is in a second step crimped to an inner measurement of the fixing contour by means of a second crimp stage.

19. The plug connector device according to claim 1, configured as an optical plug connector device.

* * * * *